UNITED STATES PATENT OFFICE.

VINCENT E. KEEGAN, OF ROXBURY, MASSACHUSETTS.

IMPROVEMENT IN THE MANUFACTURE OF SALTPETER.

Specification forming part of Letters Patent No. 59,611, dated November 13, 1866.

*To all whom it may concern:*

Be it known that I, VINCENT E. KEEGAN, M. D., of Roxbury, in the county of Norfolk and State of Massachusetts, have invented a new and useful Improvement in the Manufacture of Saltpeter; and I do hereby declare that the following is a full, clear, and exact description of the same.

This invention relates to a process for the manufacture of nitrate of potassa, or saltpeter, wherein the process is imitated which is employed by nature in producing saltpeter in caves, and which consists in placing potassa under the influence of an abnormal condition of the atmosphere produced by the absence of all electric power of the sun's rays.

In carrying out my process I spread a quantity of potassa in thin layers on trays or on the floor in a dark room, and thus expose it to the action of the atmospheric air. Being placed under this influence, it gradually absorbs five atoms of oxygen and one of nitrogen, forming nitrate of potassa. The change takes place in from one to six weeks, forming handsome crystals of the purest quality. By this process pure nitrate of potassa can be produced at a small expenditure of time and money.

The process may be facilitated by keeping the temperature in the dark room as nearly uniform as possible at about 66° Fahrenheit, or at any other temperature found to be most advantageous for the purpose desired.

What I claim as new, and desire to secure by Letters Patent, is—

The within-described process of producing nitrate of potassa by treating potassa substantially in the manner set forth.

VINCENT E. KEEGAN, M. D.

Witnesses:
MARY E. HARLOW,
ASAHEL M. SHURTLEFF.